Patented Apr. 18, 1933

1,904,382

UNITED STATES PATENT OFFICE

JACQUE C. MORRELL, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

PROCESS FOR SWEETENING HYDROCARBON DISTILLATES CONTAINING MERCAPTANS

No Drawing. Application filed November 15, 1929. Serial No. 407,372.

This invention relates to the treatment of hydrocarbon oils, in particular cracked hydrocarbon distillates, and is specifically directed to the process of treating known as "sweetening."

In the ordinary treatment of cracked distillates to produce marketable products, that is, those which are of suitable color, odor, and stability to conform to regular market specifications, the common method of refining is to treat with sulphuric acid and caustic soda in separate steps. Usually the oil is redistilled in the presence of steam after such treatment. With oils containing a high percentage of sulphur, especially that group of sulphur compounds known as mercaptans, an additional treatment must be given to render the oil sweet. Technically, the oil is said to be sweet when it will not react with a solution containing litharge and caustic soda in the presence of elementary sulphur. The method of test is known as the doctor test, and the method of procedure is well known. The sulphur compounds known as the mercaptans, as well as hydrogen sulphide, react with the doctor solution. Hydrogen sulphide is relatively easily removed, but the mercaptans are more difficult to remove or convert. In order to render an oil sweet, in addition to the ordinary refining requirements it is usually treated with plumbite or doctor solution at some stage in the refining, either before or after distillation. In order to complete the reaction caused by plumbite treatment, elementary sulphur is added. The changes which occur may be summed up briefly as follows:

The treatment with plumbite solution causes the formation of lead mercaptides which are solid materials and, for the most part, remain dispersed in the oil. The lower members of the series are more readily precipitated from the oil, while the higher members are practically in true solution. In order to render the oil sweet, the mercaptides must be removed as such or converted into other compounds. As stated, the usual method of such conversion is to add sulphur which reacts with the mercaptides to form disulphides and lead sulphide.

However, this addition of elementary sulphur to cracked distillation is undesirable. The present invention contemplates the elimination of the treatment with elementary sulphur in the following manner:

It has been found when distillates containing mercaptans are treated with plumbite solution, and subsequently exposed to the action of actinic rays which compose the short wave length ultraviolet range of the light spectrum, that the oil is rendered sweet either by direct precipitation of the lead mercaptide or the combined action of the ultraviolet light or actinic rays and dissolved oxygen in the oxidation of the lead mercaptides to form the disulphides, thus rendering the oil sweet. In the application of the process, the oil is first treated with plumbite solution, plumbite sludge withdrawn, and the oil subjected to the action of actinic rays or ultraviolet light, preferably while bubbling air or other oxidizing gas therethrough. In the practical application of the process the oil may be exposed through proper transparent material which transmits ultraviolet light, preferably from an artificial source such as a mercury lamp or a carbon arc, or an arc from a combination carbon and metallic electrode.

The distillate may be given a conventional treatment prior to the plumbite treatment and subsequent exposure to the actinic rays or ultraviolet light, for example, sulphuric acid and caustic soda treatment in separate steps, with distillation before or after the ultraviolet light treatment.

The mercaptide may be formed by the use of the compounds of metals other than lead, e. g. salts of copper, silver and other heavy metal salts may be used instead of lead.

As a specific example of the results obtainable by this process, the sour gasoline, that is, one containing mercaptans, was treated with a 16° Baumé caustic solution containing about 1½% of litharge dissolved in the caustic solution. Lead mercaptides were formed and the whole was exposed to ultraviolet light from a special lamp for a period of twenty minutes. The lead mercaptides were precipitated and the gasoline was sweet to the doctors test.

The treated gasoline was 58° Baumé gravity, had an initial boiling point of 102° F. and an end point of 437° F. and showed a marked improvement in odor after the treatment. Cracked distillates containing gas oil, as well as gasoline, were similarly sweetened. Bubbling the air through the gasoline or exposing to actinic rays promoted the sweetening action.

I claim:

A process for sweetening hydrocarbon distillate containing mercaptans which comprises converting the mercaptans to mercaptides by treating the distillate with plumbite solution, and then precipitating the mercaptides by exposing the distillate to ultraviolet light.

In testimony whereof I affix my signature.

JACQUE C. MORRELL.